ns Patent Office 3,749,772
Patented July 31, 1973

3,749,772
DERMAL PROTECTIVE FILM
Nathan F. Cardarelli, Copley, and Seymour Zachary Mansdorf, Akron, Ohio, assignors to The University of Akron, Akron, Ohio
No Drawing. Filed Dec. 4, 1970, Ser. No. 95,412
Int. Cl. A61k 15/00
U.S. Cl. 424—81                                    3 Claims

ABSTRACT OF THE DISCLOSURE

Composition of matter for preventing skin irritation from contact with "poison ivy." The composition is based upon a film-forming acrylic polymer and includes a linking agent so that upon application by a solvent carrier to the skin a selective membrane is formed. The composition may also include an oxidizing agent for breakdown of irritation causing allergens selectively retained by the membrane.

BACKGROUND OF THE INVENTION

Heretofore, effective prevention of skin irritation or dermatitis from contact with "poison ivy" (or any other member of the Anacardiaceae family of plants) has involved techniques which fall into three main groups.

The first group can be classified as "Washing Agents and Solvents." Strong laundry soap has long been used as a poison-ivy preventive, despite its limited effectiveness. The soap's lather, when allowed to dry on the skin, has reportedly given good protection to some highly sensitized persons.

The second group can be classified as "Barrier Creams and Ointments." Creams and ointments meant to keep the allergen off the skin have heretofore been judged generally unsatisfactory. Such "barrier" ingredients as perborate, ferric chloride and white petroleum are occasionally effective in shutting out the allergen.

The third group can be classified as "Detoxicants." At least in theory, poison-ivy dermatitis might be preventable if the chemical irritant in the allergen could be neutralized by other chemicals.

Effective prevention of poison-ivy dermatitis requires a composition of matter which will not in and of itself be an irritant, which will be cosmetically acceptable, which will maintain its effectiveness over a reasonable period of time, and which is easy to apply. Further, a composition having a "detoxicant ingredient" will further increase the effectiveness in preventing poison-ivy dermatitis.

SUMMARY OF THE INVENTION

The object of the invention is to provide a new and novel composition of matter for preventing skin irritation from contact with "poison ivy." More particularly, it is an object to provide a composition of matter for the prevention of poison-ivy dermatitis which is not an irritant, which will maintain its effectiveness over a reasonable period of time, which is easy to apply and which has a detoxicant ingredient therein.

These and other objects of the invention, and the advantages thereof, will be apparent in view of the detailed disclosure of the invention as set forth below.

In general, a composition of matter according to the invention comprises a film-forming acrylic polymer base cross linked by a linking agent upon application to human skin by a solvent carrier to form a selective membrane. The composition may also include as a detoxicant an oxidizing agent.

The film-forming acrylic polymer may be a suitable member of the family comprised of polymers of acrylic, substituted acrylic, and methacrylic acids, their salts and esters and other derivatives. The nature of the acrylic acid molecule is polymerizable and properties of other polymers may be modified by reacting them with varying amounts of acrylic acid. A suitable acrylic polymer is available commercially under the registered trademark of Carboset, 514 by the B. F. Goodrich Co., but since it is produced under a secret process, the exact chemical composition is not known. However, reference may be made to the disclosure of U.S. Pat. No. 3,007,887, granted to B. F. Goodrich Co., Nov. 7, 1961, for a description of the chemical characteristics of film-forming acrylic polymers considered sufficient to enable a person skilled in the art of compound formulation to make and use the composition of matter according to the invention.

This particular patent describes a polymeric composition conforming to the structure

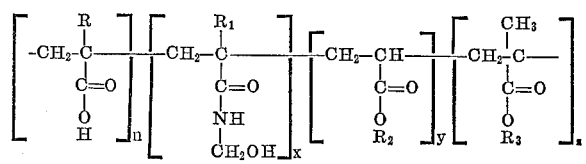

wherein R and $R_1$ each represents hydrogen and methyl; $R_2$ represents methyl, ethyl, propyl and butyl; $R_3$ represents methyl and ethyl; $n$ represents from 3 to 12 weight percent based on the combined weight of $x$, $y$ and $z$; $x$ represents from 8 to 25 weight percent based on the combined weight of $n$, $x$ and $z$; $y$ represents from 45 to 89 weight percent based on the combined weight of $n$, $x$ and $z$; $z$ represents from 0 to 44 weight percent based on the combined weight of $n$, $x$ and $y$; the sum of the numerical values of $n+x+y+z$ is always 100 and the groups $n$, $x$, $y$ and $z$ are present in the polymer in a heterogeneous relative order.

The polymers embodied in this structure are those compositions comprising from 45 to 89 parts by weight of a lower acrylic acid ester, from 0 to 44 parts by weight of a lower methacrylic acid ester, from 3 to 12 parts by weight of an alpha-beta olefinically unsaturated carboxylic acid having a terminal $CH_2=C<$ group and having from 3 to 4 carbon atoms and from 8 to 25 parts by weight of an N-methylol alpha-beta olefinically unsaturated carboxylic acid amide having a terminal $CH_2=C<$ group and having from 4 to 5 carbon atoms.

The lower acrylic acid esters useful in this structure include those in which $R_2$ in the above formula is an aliphatic hydrocarbon group having from 1 to 4 carbon atoms such as methyl acrylate, ethyl acrylate, n-propyl acrylate, isopropyl acrylate, n-butyl acrylate, isobutyl acrylate and secondary butyl acrylate. The most preferred lower acrylic acid esters are methyl acrylate and ethyl acrylate. The lower acrylate acid esters are useful in the range of from about 45 to 89 weight percent based on the weight of the other monomers.

The lower methacrylic acid esters useful in this structure include those in which $R_3$ in the above formula is an aliphatic hydrocarbon group having from 1 to 2 carbon atoms such as methyl methacrylate and ethyl methacrylate. The preferred methacrylic acid ester is methyl methacrylate. The lower methacrylic acid esters are useful in the range of from about 0 to about 44 weight percent based on the weight of the other monomers.

The alpha-beta olefinically unsaturated carboxylic acids embodied in this structure include acrylic acid and methacrylic acid. The alpha-beta olefinically unsaturated carboxylic acids are useful in the range of from about 3 to about 12 weight percent based on the weight of the other monomers.

The N-methylol acrylic amides embodied in this structure include N-methylol acrylamide and N-methylol methacrylamide. The most preferred N-methylol acrylic amide is N-methylol acrylamide. The N-methylol acrylic amides are useful in the range of from about 8 to 25 weight percent based on the weight of the other monomers.

The linking agent for forming the acrylic polymer film may be one of the metals of the group comprising calcium, magnesium, and zinc in ammonium hydroxide or the like to form a complex having a pH in the range of 7.1 to 10.5.

The solvent carrier may be any alcohol having from 2 to 5 carbon atoms such as ethyl, n-propyl, isopropyl, n-butyl, sec-butyl, tert-butyl, isobutyl and n-amyl. A second class of solvent carrier may be any ester of acetic acid having from 2 to 5 carbon atoms such as ethyl acetate, n-propyl acetate, isopropyl acetate, n-butyl acetate, sec-butyl acetate, tert-butyl acetate, isobutyl acetate, and n-amylacetate.

The detoxicant may be any oxidizing agent such as hydrogen peroxide, hypochlorous acid, iodine, potassium permanganate, sodium hypochlorite, sodium perborate, or any other oxidizing agent strong enough to breakdown the irritation causing allergens rapidly without causing an irritation itself.

DESCRIPTION OF A PREFERRED EMBODIMENT

The composition is formulated by mixing the Carboset solution with a proportionate amount of the linking agent in the solvent carrier and adding the selected oxidizing agent. The amount of Carboset may vary from 2% of the total weight of the mixture to 22% with the optimum range falling between 5% to 8%. Utilizing zinc oxide for the linking agent, the amount necessary to link the Carboset may be an amount up to 0.3% of the total weight of the mixture with 0.1% being normally sufficient. Ammonium hydroxide forms a complex with the zinc oxide and upon evaporation permits the zinc to crosslink the Carboset. As a substitute for the zinc complex either a form of a calcium bromide alcohol or a magnesium bromide alcohol may be used to link the Carboset.

To cause the rapid breakdown of the irritant causing allergen retained on the membrane a suitable oxidizing agent may be added as a detoxicant in an amount of from 0.1% to 5% by weight. Two additional criterion are to be considered in selecting the detoxicant, the first of which is that the amount to be added does not bring the pH of the entire composition below 7.1 and secondly that the agent is not harmful to the body.

The remaining weight percent of the mixture is made up by the solvent carrier which may be either the alcohols of from 2 to 5 carbon atoms, or the esters of acetic acid of from 2 to 5 carbon atoms.

It is of primary importance that the pH of the resulting composition be kept within the range of 7.1 to 10.5, the lower figure representing the beginning of Carboset solubility and the upper figure representing the safe limit for application to the body. All of the components may vary by weight percent, however, as more Carboset solution is utilized, an increase of the linking agent complex is required along with a corresponding decrease both in the amount of the oxidizing agent and of the solvent carrier.

MODE OF OPERATION OF INVENTION

The prevention of skin irritation caused by poison ivy utilizing a selective membrane is readily verified by actual tests. A formulation, J-2 as set forth below, according to the concept of the present invention was sprayed onto the left arm of four volunteers. Freon (placebo) was applied to the right arms and both arms were allowed to dry. Two and one-half microliters of 1% concentration of RHUS oleoresin, the irritant, allergen of poison ivy, in alcohol was then applied to both arms. The results achieved below were graded by the numerals 0 (none) through 4 (erythema plus vesicles).

J-2 FORMULATION

| Compound: | Weight percent |
|---|---|
| Carboset 514 | 11.6 |
| Ethanol (95%) | 38.3 |
| Isopropanol | 38.3 |
| Zinc oxide (5.8%) | 4.6 |
| Ammonium hydroxide (28%) | 7.2 |
| | 100.0 |

DERMATITIS ARM TEST
[1% RHUS oleoresin]

| Volunteer | J-2 | Placebo |
|---|---|---|
| A | 0 | 2 |
| B | 1 | 4 |
| C | 1 | 3 |
| D | 0 | 2 |
| | 0.5 | 2.75 |

The above test is more favorable than the figures represent since the alcohol utilized as a solvent for the oleoresin was the same solvent of the selective membrane. Other tests, in which the arms of the volunteers were rubbed with poison ivy leaves, resulted in complete protection by the membrane.

We claim:
1. In the method of applying a selective membrane to skin to prevent contact with poison ivy by, the improvement comprising the steps of: selecting a solvent carrier selected from the group consisting of 2–5 carbon atoms of alcohol and 2–5 carbon atoms of esters of acetic acid, dispersing therein from two to about twenty-two percent by weight of a film forming polymer selected from the class consisting of acrylic polymers and substituted acrylic polymers, adding a cross-linking agent to said acrylic polymer solution selected from the class consisting of calcium bromide alcohol, magnesium bromide alcohol and a complex formed by a zinc oxide and ammonium hydroxide, maintaining the pH of said polymer solution from 7.1 to about 10.5, and applying said acrylic polymer cross-linking solution to the human skin so that upon evaporation of said solvent said linking agent will cross-link the polymer to form the selective membrane.

2. The method of use of a cross-linked film forming acrylic polymer applied to the human skin as a selected membrane, as set forth in claim 1, including the additional step of adding 0.1 to 5.0% by weight of a detoxicant oxidizing agent selected from the group consisting of hydrogen peroxide, hypochlorous acid, iodine, potassium permanganate, sodium hypochloride and sodium perborate.

3. The method of use of a cross-linked film forming acrylic polymer applied to the human skin as a selected membrane, as set forth in claim 1, wherein the acrylic forming polymer is a mechanically stable, strong, insoluble, flexible film forming thermosetting, water soluble, interpolymer cured from a lower acrylic acid ester, a lower methacrylic acid ester, an $\alpha$-$\beta$ olefinically unsaturated carboxylic acid and N-methylol acrylic amides conforming to the structure

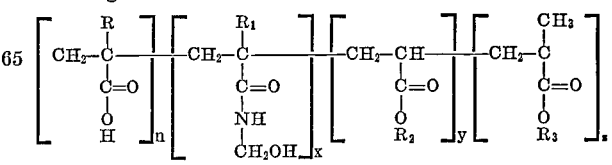

wherein R and $R_1$ are members of the group consisting of hydrogen and methyl; $R_2$ is a member of the group consisting of methyl, ethyl, propyl and butyl; $R_3$ is a member of the group consisting of methyl and ethyl; $n$ represents from 3 to 12 weight percent based on the combined weight of $n$, $x$, $y$ and $z$; $x$ represents from 8 to 25 weight percent based on the combined weight of $n$, $x$, $y$ and $z$; $y$ represents from 45 to 89 weight percent based on the combined weight of $n$, $x$, $y$ and $z$; $z$ represents from 0 to 44 weight percent based on the combined weight of $n$, $x$, $y$ and $z$; the sum of the numerical value of $n+x+y+z$ is always exactly 100 and the groups $n$, $x$, $y$ and $z$ are present in a heterogeneous relative position.

References Cited
UNITED STATES PATENTS

| | | | |
|---|---|---|---|
| 2,267,739 | 12/1941 | Kemppe | 424—145 |
| 2,095,092 | 10/1937 | Barton | 424—145 X |
| 2,420,389 | 5/1947 | Travis et al. | 424—145 |
| 3,590,118 | 6/1971 | Conrady et al. | 424—81 X |
| 3,007,887 | 11/1961 | Essig | 260—29.6 |
| 2,870,129 | 1/1959 | Merriam | 260—86.1 |
| 3,657,413 | 4/1972 | Rosenthal | 424—81 |
| 3,579,628 | 5/1971 | Gander et al. | 424—28 |
| 3,577,516 | 5/1971 | Gould et al. | 424—46 |
| 3,011,950 | 12/1961 | Mehaffey | 424—81 X |

OTHER REFERENCES

Chem. Abst. 62: 11999e of France, 1,359,531 (1965).
Chem. Abst. 56: 7506i of France, 1,255,077 (1962).
Chem. Abst. 55: 27940h of Germany, 1,103,569 (1961).
Chem. Abst. 54: 16928e of Great Britain, 831,061 (1960).

SHEP K. ROSE, Primary Examiner

U.S. Cl. X.R.

424—10, 130, 145, 148, 149, 150